Nov. 1, 1955  W. G. STOECKICHT  2,722,302
HYDRAULICALLY ACTUATED CLUTCHES AND BRAKES
Filed Feb. 28, 1951
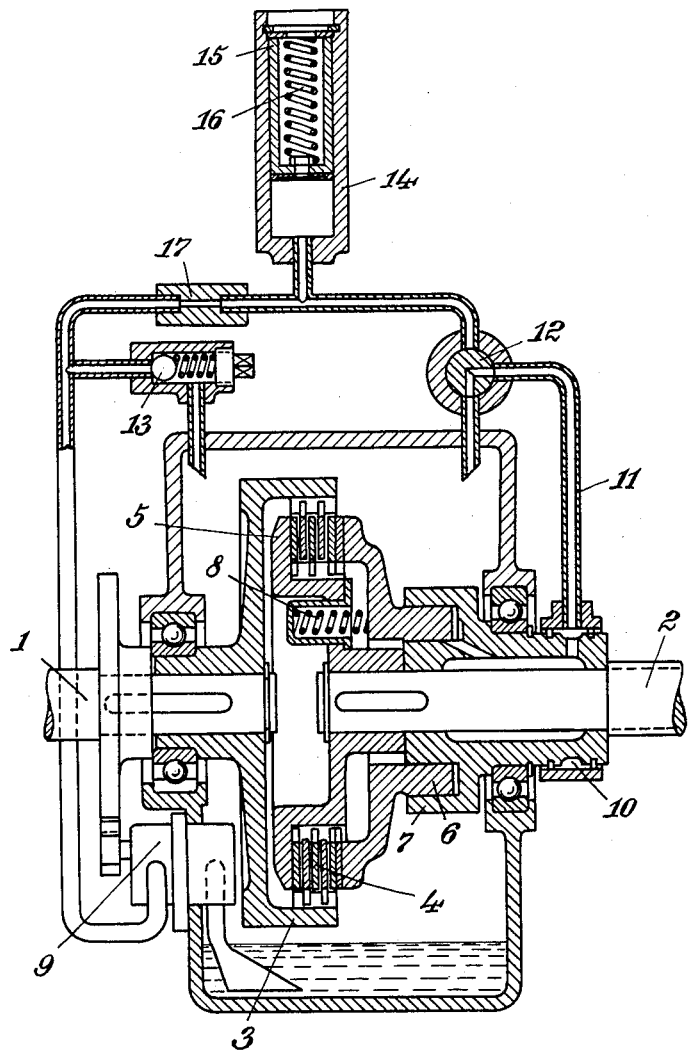
Inventor:
Wilhelm G. Stoeckicht.
BY
Harness, Dickey & Pierce
Attorney

United States Patent Office 2,722,302
Patented Nov. 1, 1955

2,722,302

HYDRAULICALLY ACTUATED CLUTCHES AND BRAKES

Wilhelm G. Stoeckicht, Munich-Solln, Germany

Application February 28, 1951, Serial No. 213,234

Claims priority, application Germany August 11, 1950

2 Claims. (Cl. 192—85)

This invention relates to a hydraulically actuated clutch or brake, more particularly for use in change-speed and reversing gears.

By the engagement or disengagement of such clutches or brakes the gear is changed from one speed to the other. In order to utilise fully the advantages of such a control it is important that the engaging operation for the clutch or brake should be effected on the one hand in the shortest possible interval of time and on the other hand with adequate smoothness, so as to avoid a hard or jerky control. Hydraulic actuation of brakes or clutches, for instance in reversing gears, automobile drives and so forth, is also particularly advantageous because here the linkage can be especially simply constructed in the form of a hydraulic linkage.

It is already known, for the hydraulic actuation of such clutches or brakes, to use a pump which is driven either from the driving shaft of the gear or else independently.

Known means for applying the brakes or closing the clutches of such gears have hitherto proved incapable of operating in a completely satisfactory manner, in so far as they worked either too harshly, when the quickness was adequate, or too slowly, when the smoothness was sufficient.

According to this invention there is interposed in the delivery pipe of the pump a piston displaceable in a cylinder against the action of a spring, the characteristic and the initial stress of this spring being so selected that it relaxes, immediately after the opening of the actuating means of the brake or clutch, with displacement of the piston, to such an extent that the pressure that is produced in the associated hydraulic power appliance gives the desired initial force for engaging the clutch or brake, the volume of liquid displaced under these circumstances by the piston, that is to say, its stroke volume being approximately equal to the filling volume of the power appliance that closes the clutch or applies the brake.

In this way the filling of the power appliance of the clutch or brake is effected practically without loss of time and independently of the delivery quantity of the pump. By the adjustability of the initial stress of the spring the engaging of the clutch or brake is effected with any desired power and with any desired smoothness. After the friction surfaces of the clutch or brake have in this way been brought into contact with minimum force, the pressure gradually rises to such an extent that the piston interposed according to the invention in the delivery pipe of the pump is pushed back into its initial position, against the action of its spring, by the liquid delivered by the pump. The force with which the friction surface of the clutch or brake are pressed against one another thus increases gradually to the same extent as the stress of the spring-loaded piston interposed in the delivery pipe of the pump increases.

It is advisable, according to a further feature of the invention, to provide an exchangeable spring, in order in this way to be able to vary the characteristic of the spring that is put in.

If a spring with a very flat characteristic is employed, so that its stress, upon the power appliance of the brake or clutch filling up, diminishes but slightly, practically no fall of pressure is obtained during the engaging operation of the clutch or brake. The clutch or brake is then from the outset applied with the full application pressure, so that the closing or applying operation is harsh. It is therefore in one's power, by a corresponding choice of the characteristic of the spring, to make the engaging operation of the clutch or brake as soft or as hard as may be desired.

Similarly it is advisable to make the initial stress of the spring adjustable. In this way it is possible, with a given spring, to vary the initial force with which the friction surfaces of the clutch or brake bear upon one another when they first come into contact.

According to a further feature of the invention there is interposed between the spring-loaded piston and the pump a throttling point. In this way the result is obtained that the smoothness of the engaging operation is practically independent of the quantity delivered by the pump, and therefore of the speed of revolution of the driving motor.

The accompanying drawing shows in axial section a simplified representation of one form of construction of the invention, wherein for the sake of simplicity only one clutch is illustrated. The invention may however alternatively be used with a brake, for instance a shoe brake or a band brake. The other parts of the gear are omitted for the sake of simplicity. It may be observed however that the invention is suited above all for an epicyclic gear, since such a gear can be particularly easily controlled by engaging or disengaging friction clutches or brakes.

The friction clutch selected as an example is arranged between a driving shaft 1 and a driven shaft 2, and consists essentially of an outer clutch body 3 secured to the driving shaft, a stack of laminations 4, and an inner clutch body 5 secured to the driven shaft. The stack of laminations 4 can be brought into frictional engagement by means of a piston 6, which, in a pressure cylinder 7, can be supplied by a liquid under pressure, preferably oil. When the pressure liquid is shut off, the piston 6 is retracted from the stack of laminations by the thrust of a spring 8.

The shaft 1 drives an oil pump 9, which delivers the oil necessary for the actuation of the clutch. Oil under pressure is supplied to the pressure cylinder 7 in a known manner by way of an annular groove or channel 10 between packings. In a pipe 11 leading to this oil supply groove 10 there is a switching valve 12, here shown as a cock, by which pressure oil is admitted to the pressure cylinder or shut off form it. Between the oil pump 9 and the switching valve 12 there are connected to the oil pipe an overload valve 13, which limits the pressure of the oil, and a storage cylinder 14, in which a piston 15 is pressed back by the oil against the thrust of a spring 16. The stroke volume of the storage cylinder 14 is so dimensioned that it more or less corresponds to the filling space of the pressure cylinder 7. A throttling element of constant throttling capacity is interposed between pump 9 and storage cylinder 14.

The method of working of the arrangement may be described as follows. The driving shaft 1 drives the oil pump 9. Assuming first that the switching valve 12 is closed, that is to say, that it is shutting off the pipe leading to the pressure cylinder 7. It will be seen from the drawing that in the oil pipe 11 the oil is subject to the working pressure regulated by the excess-pressure valve 13. The oil pressure presses back the piston 15, in the storage cylinder 14 against the thrust of the spring 16. If the inlet from the storage cylinder 14 to the pressure cylinder 7 of the clutch is now opened by the switching valve 12, the piston 6 therein presses the stack of laminations 4 together against the action of the spring 8. Since in the released condition there must be a certain distance between the individual friction surfaces of the laminations, the piston 6 must traverse a path which corresponds to the sum of these distances before encountering a resistance. Thus the following takes place in the oil-pipe system: the spring 16, through the medium of the piston 15, forces the oil from the storage cylinder 14 into the clutch pressure cylinder 7; and since the stroke volumes of these two cylinders are approximately equal, the filling of the pressure cylinder 7 is effected practically without loss of time, and independently of the delivery quantity of the oil pump 9 the delivery from which is restricted by throttling element 17. During this operation the spring 16 relaxes down to the pressure that is necessary for the engaging movement of the piston 6. Therefore at the moment at which the friction clutch is brought into engagement, the application pressure upon the friction surfaces is quite small. From then onwards, however, the oil pump 9 continues to deliver oil; and thus the storage cylinder is refilled, the piston 15 re-compressing the spring 16, until in the end position the normal working pressure in the oil system is again attained. Throttling element 17 defines the period for refilling storage cylinder 14 and building up the pressure in clutch actuating cylinder 6, 7. This means that during the interval of time that is needed for the filling of the storage cylinder, the oil pressure, and therefore the application pressure of the clutch, gradually increase from approximately zero up to the full value. In this way an immediate closing of the clutch is obtained, the engaging operation being smooth.

Such hydraulically actuated clutches or brakes play an important part in reversing gears or in vehicle change-speed gears. In these it is particularly important, when changing gears, on the one hand that the engagement of the freshly closing clutch should be effected immediately, and on the other hand that this engagement should proceed with a predetermnied degree of hardness or smoothness. This invention ensures a design in which these operative conditions prevail.

It is of course quite possible to combine the excess-pressure valve 13 with the storage cylinder 14. In this case the spring-loaded piston 15, in its end position, opens, in a known manner, outlet ports for the excess oil.

In those cases however in which the speed of revolution of the driving shaft 1, and therefore of the oil pump 9, is subject to fluctuation, as is the case in all vehicle engines for example, it is advisable to retain a separate overload valve 13, and to provide, bteween this valve and the storage cylinder 14, throttling nozzle 17. The overload valve 13 then ensures, in the space preceding the throttling nozzle 17, a constant oil pressure, except perhaps at the lowest starting speeds, at which the oil pump has not yet reached its full delivery pressure. This means that over practically the entire range of speeds of revolution the quantity of oil that can be supplied to the storage cylinder 14 per unit of time is substantially constant. It furthermore means that independently of the speed of revolution of the oil pump, the duration and the desired smoothness of the engaging operation remain practically constant.

In the constructional example an arrangement is illustrated in which the pump delivering the pressure oil is driven by the driving shaft of the clutch unit. It is of course also possible for this oil pump to have an independent drive without the essence of the invention being thereby affected at all.

Thus the invention provides a switching member wherein, independently of the skill of the operator, the individual changes are carried out quickly, and at the same time smoothly.

What I claim is:

1. In a hydraulically actuated friction drive, a source of fluid pressure, frictional means including a plurality of frictional elements adapted to move one against another, a chamber of variable size, the movable part of said chamber being operatively connected to said frictional means, means connecting said chamber with said source of fluid pressure, control means in said connecting means and actuatable to open or close said connection, opening of said connection causing said frictional elements to be brought into engagement, resilient means for moving said frictional elements out of engagement, a cylinder, a piston movable in said cylinder, resilient means interposed between one side of said piston and said cylinder, a stop adapted to limit the movement of said piston in one direction, the other side of said piston together with said cylinder forming a second chamber of variable size connected to the connecting means between said control means and said source of fluid pressure, said stop limiting said second chamber to a maximum size approximately equal to the size of said first chamber when said frictional elements are brought into engagement, said resilient means urging said piston in opposition to the fluid pressure acting thereon, a safety valve for limiting the highest pressure produced by said source of fluid pressure, and a throttling element of constant throttling capactiy interposed in said connection between said source of fluid pressure and said second chamber, said throttling element limiting the rate of refilling of said second chamber by the fluid pressure after said frictional elements are engaged.

2. The combination according to claim 1, said source of fluid pressure comprising a pump, and means for driving one of said frictional elements, said driving means also driving said pump.

References Cited in the file of this patent

UNITED STATES PATENTS

| 1,611,545 | Maybach | Dec. 21, 1926 |
| 1,869,085 | Williamson | July 26, 1932 |
| 1,938,979 | Sawtelle | Dec. 12, 1933 |
| 2,105,625 | Wichtendahl | Jan. 18, 1938 |
| 2,159,170 | Maybach | May 23, 1939 |
| 2,330,739 | Piron | Sept. 28, 1943 |
| 2,372,393 | Ray | Mar. 27, 1945 |
| 2,384,182 | Lewis | Sept. 4, 1945 |
| 2,516,203 | Greenlee et al. | July 25, 1950 |
| 2,548,208 | Evernden | Apr. 10, 1951 |

FOREIGN PATENTS

| 474,539 | Great Britain | Nov. 3, 1937 |
| 524,702 | Great Britain | Aug. 13, 1940 |